US010768417B2

(12) United States Patent
Kusafuka et al.

(10) Patent No.: US 10,768,417 B2
(45) Date of Patent: Sep. 8, 2020

(54) DISPLAY DEVICE AND VEHICLE HEAD-UP DISPLAY APPARATUS

(71) Applicant: KYOCERA Corporation, Kyoto (JP)

(72) Inventors: Kaoru Kusafuka, Tokyo (JP); Yusuke Hayashi, Fort Lee, NJ (US); Satoshi Kawaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 64 days.

(21) Appl. No.: 16/095,647

(22) PCT Filed: Apr. 25, 2017

(86) PCT No.: PCT/JP2017/016429
§ 371 (c)(1),
(2) Date: Oct. 22, 2018

(87) PCT Pub. No.: WO2017/188277
PCT Pub. Date: Nov. 2, 2017

(65) Prior Publication Data
US 2019/0129169 A1 May 2, 2019

(30) Foreign Application Priority Data
Apr. 26, 2016 (JP) .................................. 2016-088149

(51) Int. Cl.
G02B 27/01 (2006.01)
B60K 35/00 (2006.01)
(Continued)

(52) U.S. Cl.
CPC .......... *G02B 27/0101* (2013.01); *B60K 35/00* (2013.01); *G02B 5/30* (2013.01);
(Continued)

(58) Field of Classification Search
CPC .... G02B 27/0101; G02B 27/01; B60K 35/00; G02F 1/133528
See application file for complete search history.

(56) References Cited

U.S. PATENT DOCUMENTS 10,067,343 B2    9/2018  Yoshida et al.
10,234,682 B2 *  3/2019  Yagi .................. G02B 27/0101
(Continued)

FOREIGN PATENT DOCUMENTS

EP          3086169 B1 *  8/2019
JP         2003-104087 A    4/2003
(Continued)

Primary Examiner — Ricardo Osorio
(74) Attorney, Agent, or Firm — Studebaker & Brackett PC

(57) ABSTRACT

A display device and a vehicle head-up display apparatus of the present disclosure include a substrate, light source devices, a transmission-type display panel, and an illumination optical system. The light source devices are disposed on the substrate. The illumination optical system guides illumination light from the light source devices to the display panel. The illumination optical system includes a first reflector, a quarter-wave plate, and a reflective polarizer. The first reflector is disposed at a different position on the substrate than the light source devices. The quarter-wave plate is disposed between the first reflector and the display panel. The reflective polarizer is disposed between the quarter-wave plate and the display panel.

20 Claims, 7 Drawing Sheets

(51) Int. Cl.
 *G02B 5/30* (2006.01)
 *G02F 1/1335* (2006.01)
 *B60R 11/00* (2006.01)

(52) U.S. Cl.
 CPC ....... *G02B 27/01* (2013.01); *G02F 1/133528* (2013.01); *B60R 2011/0005* (2013.01)

(56) References Cited

U.S. PATENT DOCUMENTS

| | | | |
|---|---|---|---|
| 2004/0008412 A1* | 1/2004 | Jiang | G02B 27/0101 359/487.02 |
| 2004/0105055 A1 | 6/2004 | Yu et al. | |
| 2004/0135742 A1* | 7/2004 | Weber | G02B 5/305 345/7 |
| 2007/0159673 A1* | 7/2007 | Freeman | G02B 5/1814 359/19 |
| 2012/0300486 A1* | 11/2012 | Matsushita | G02B 27/01 362/521 |
| 2016/0116979 A1* | 4/2016 | Border | G06F 3/013 345/156 |
| 2016/0299341 A1* | 10/2016 | Yoshida | G02F 1/134309 |
| 2017/0357100 A1* | 12/2017 | Ouderkirk | G02B 27/281 |
| 2018/0015876 A1* | 1/2018 | Yamagata | H04N 9/317 |
| 2019/0121128 A1* | 4/2019 | Kasahara | G02B 19/0066 |
| 2019/0129167 A1* | 5/2019 | Hayashi | G02B 27/01 |

FOREIGN PATENT DOCUMENTS

| | | |
|---|---|---|
| JP | 2008-116888 A | 5/2008 |
| JP | 2012-174573 A | 9/2012 |
| JP | 2015-118272 A | 6/2015 |
| WO | 2015093077 A1 | 6/2015 |

\* cited by examiner

DISPLAY DEVICE AND VEHICLE HEAD-UP DISPLAY APPARATUS

CROSS-REFERENCE TO RELATED APPLICATION

The present application claims priority to and the benefit of Japanese Patent Application No. 2016-088149 filed Apr. 26, 2016, the entire contents of which are incorporated herein by reference.

TECHNICAL FIELD

The present disclosure relates to a display device and a vehicle head-up display apparatus.

BACKGROUND

A vehicle head-up display apparatus includes a display device that emits display light from a display panel, such as a liquid crystal panel.

In such a display device, a light source device that emits non-polarized illumination light is typically used as the light source device for the illumination light irradiated onto the display panel. Examples of light source devices that emit non-polarized illumination light include light emitting diodes (LEDs). Only a particular polarized component of the illumination light irradiated onto the display panel is transmitted by a polarization filter provided on the light source device side of the display panel. Consequently, other polarized components in the illumination light cannot pass through the display panel, leaving room for improvement in the use efficiency of the illumination light.

A composite optical element, for example, that includes a first mirror and a second mirror that face each other, a functional film arranged between the mirrors at a certain angle, a retardation plate adjacent to the first mirror, and a light source device between the retardation plate and the functional film has been developed to address this issue. For example, see patent literature (PTL) 1. Such a composite optical element causes a certain polarized component (s-wave) within the non-polarized illumination light emitted by the light source device to be reflected by the functional film and emitted towards the display panel and causes another polarized component (p-wave) to be transmitted by the functional film to reach the second mirror. The p-wave reflected at the second mirror is converted to circularly polarized light upon passing through the retardation plate, is reflected by the first mirror, passes through the retardation plate again to become an s-wave, and is reflected by the functional film to be emitted towards the display panel. The use efficiency of the illumination light has been improved in this way.

CITATION LIST

Patent Literature

PTL 1: JP2008116888A

SUMMARY

A display device according to an embodiment of the present disclosure includes a substrate, a light source device, a transmission-type display panel, and an illumination optical system. The light source device is disposed on the substrate. The illumination optical system guides illumination light from the light source device to the display panel. The illumination optical system includes a first reflector, a quarter-wave plate, and a reflective polarizer. The first reflector is disposed at a different position on the substrate than the light source device. The quarter-wave plate is disposed between the first reflector and the display panel. The reflective polarizer is disposed between the quarter-wave plate and the display panel.

A display device according to another embodiment of the present disclosure include a substrate, a light source device, a transmission-type display panel, and an illumination optical system. The light source device is disposed on the substrate. The illumination optical system guides illumination light from the light source device to the display panel. The display panel includes an entrance-side polarizer that is a reflective polarizer. The illumination optical system includes a first reflector and a quarter-wave plate. The first reflector is disposed at a different position on the substrate than the light source device. The quarter-wave plate is disposed between the first reflector and the display panel.

A vehicle head-up display apparatus according to an embodiment of the present disclosure includes the aforementioned display device and causes display light from the display device to be reflected by a translucent plate of a vehicle so that a virtual image is visible to an operator.

DETAILED DESCRIPTION

An embodiment of the present disclosure is described in detail with reference to the accompanying drawings.

First Embodiment

Figure 1:
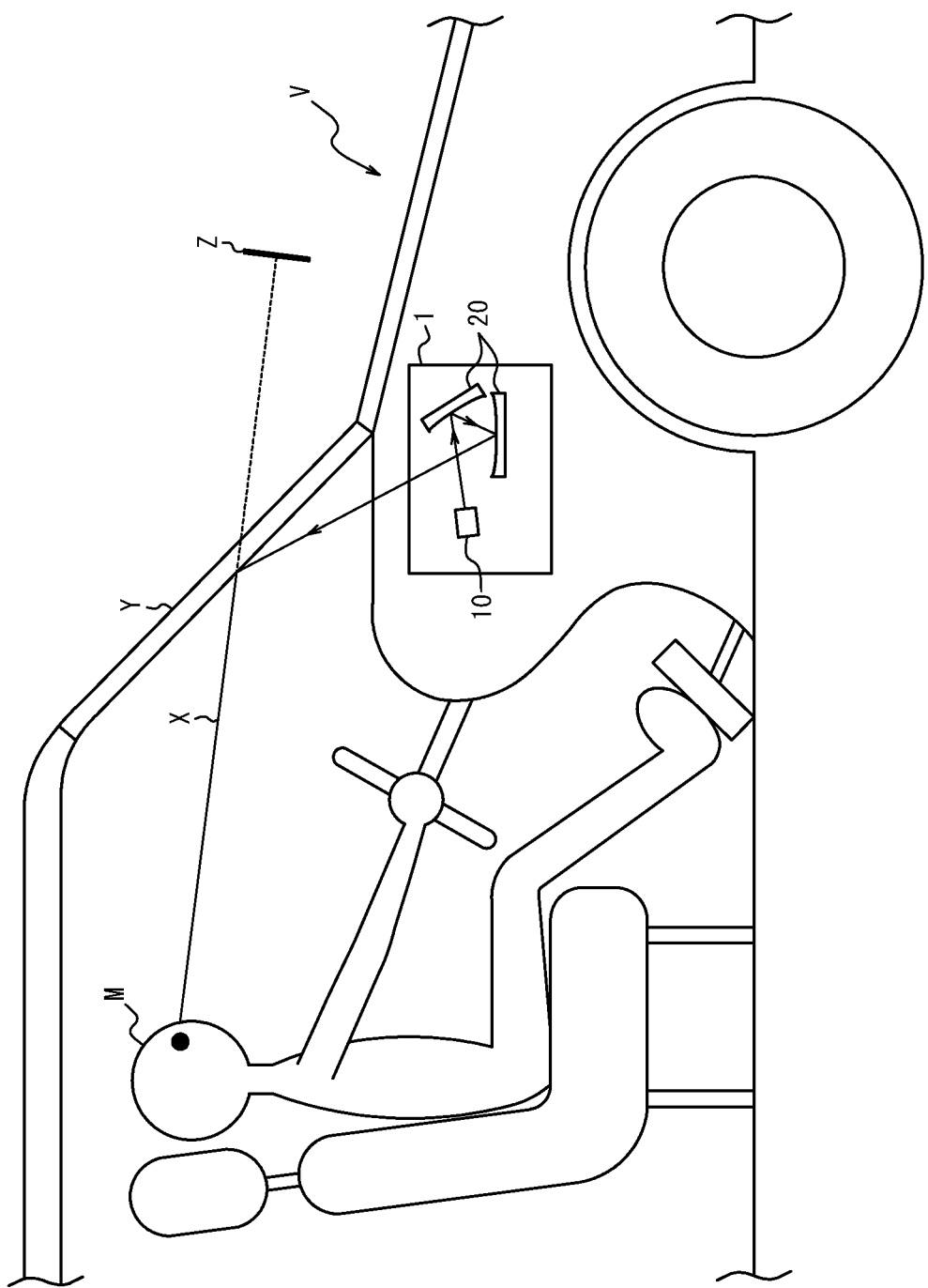
FIG. 1 illustrates the schematic configuration of a vehicle head-up display apparatus according to a first embodiment of the present disclosure.

The schematic configuration of a vehicle head-up display apparatus 1 according to the first embodiment of the present disclosure is described with reference to FIG. 1. The vehicle head-up display apparatus 1 includes a display device 10 and a projection optical system 20. The vehicle head-up display apparatus 1 is housed in the dashboard or the like of a vehicle V.

The display device 10 emits display light X through the projection optical system 20 to the outside of the vehicle head-up display apparatus 1. The display light X is reflected by a translucent plate Y, such as the windshield of the vehicle V. The reflected display light X enters the eyeballs of an operator M (driver or the like) of the vehicle V. As a result of the display light X entering the eyeballs of the operator M, a virtual image Z visible to the operator M is generated at a predetermined position in front of the translucent plate Y.

The display device 10 includes a light source device, a transmission-type display panel, and the like. The illumination light emitted from the light source device is transmitted by the transmission-type display panel. After being transmitted by the display panel, the illumination light is emitted to the outside of the display device 10. When the illumination light is transmitted by the display panel, the intensity of each wavelength of the illumination light is reduced in accordance with a desired image. The illumination light becomes the display light X by passing through the display panel. Details of the display device 10 are provided below.

The projection optical system 20 guides the display light X from the display device 10 to the translucent plate Y. The projection optical system 20 can enlarge the range over which the display light X is projected. For example, the projection optical system 20 has a mirror such as a concave mirror. FIG. 1 illustrates an example of the projection optical system 20 having two mirrors, but the number of mirrors is not limited to two.

The translucent plate Y reflects a portion of incident light. The translucent plate Y may transmit a portion of incident light. The translucent plate Y may be included in the vehicle V. Apart from the windshield of the vehicle V, the translucent plate Y may, for example, be a combiner that reflects the display light X. The translucent plate Y, such as a combiner, may be included in the vehicle head-up display apparatus 1. The translucent plate Y reflects a portion of the display light X irradiated from the vehicle head-up display apparatus 1. The translucent plate Y reflects the display light X towards the space in which the eyes of the operator M are assumed to be located.

Figure 2:
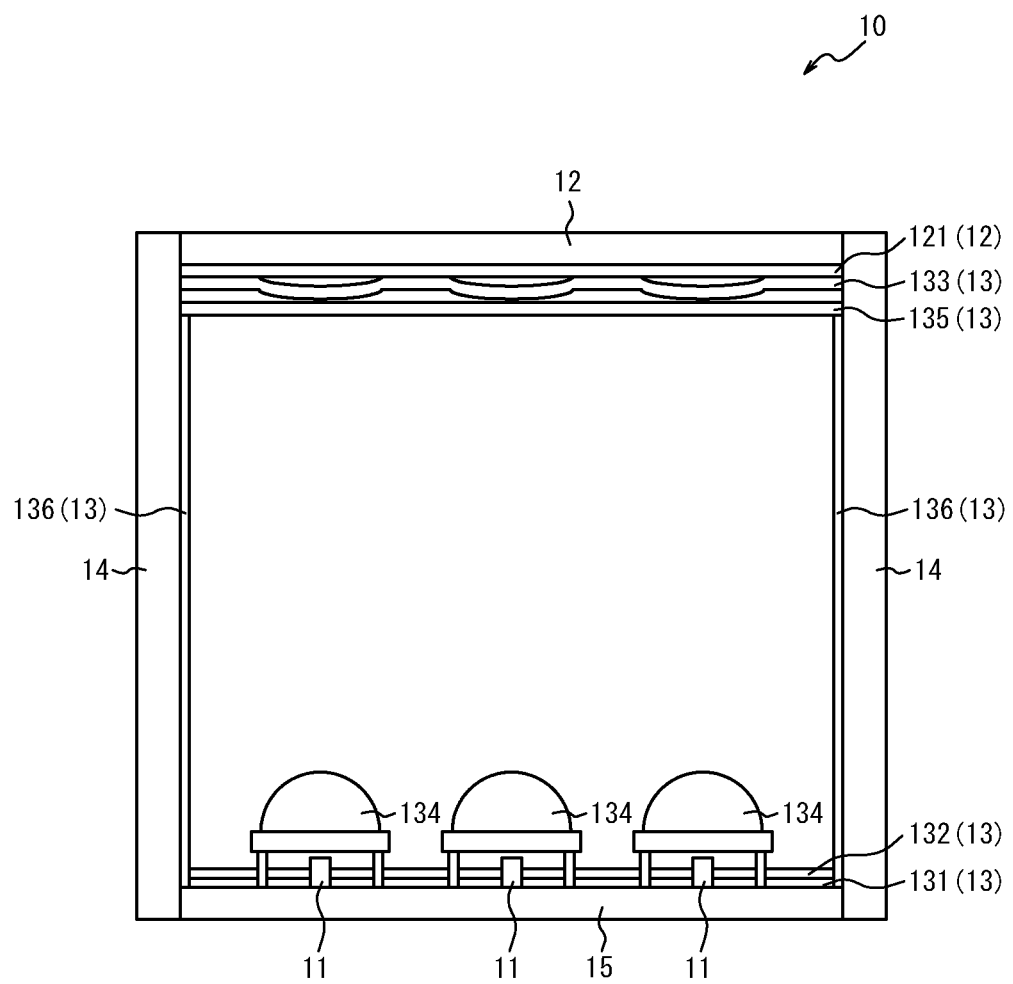
FIG. 2 illustrates the schematic configuration of a display device in FIG. 1.

The schematic configuration of the display device 10 is described with reference to FIG. 2. The display device 10 includes light source devices 11, a display panel 12, an illumination optical system 13, sidewalls 14, and a substrate 15. The display panel 12 includes an entrance-side polarizer 121. The illumination optical system 13 includes a first reflector 131, a quarter-wave plate 132, a reflective polarizer 133, lenses 134, a diffusing plate 135, and second reflectors 136.

Figure 3:
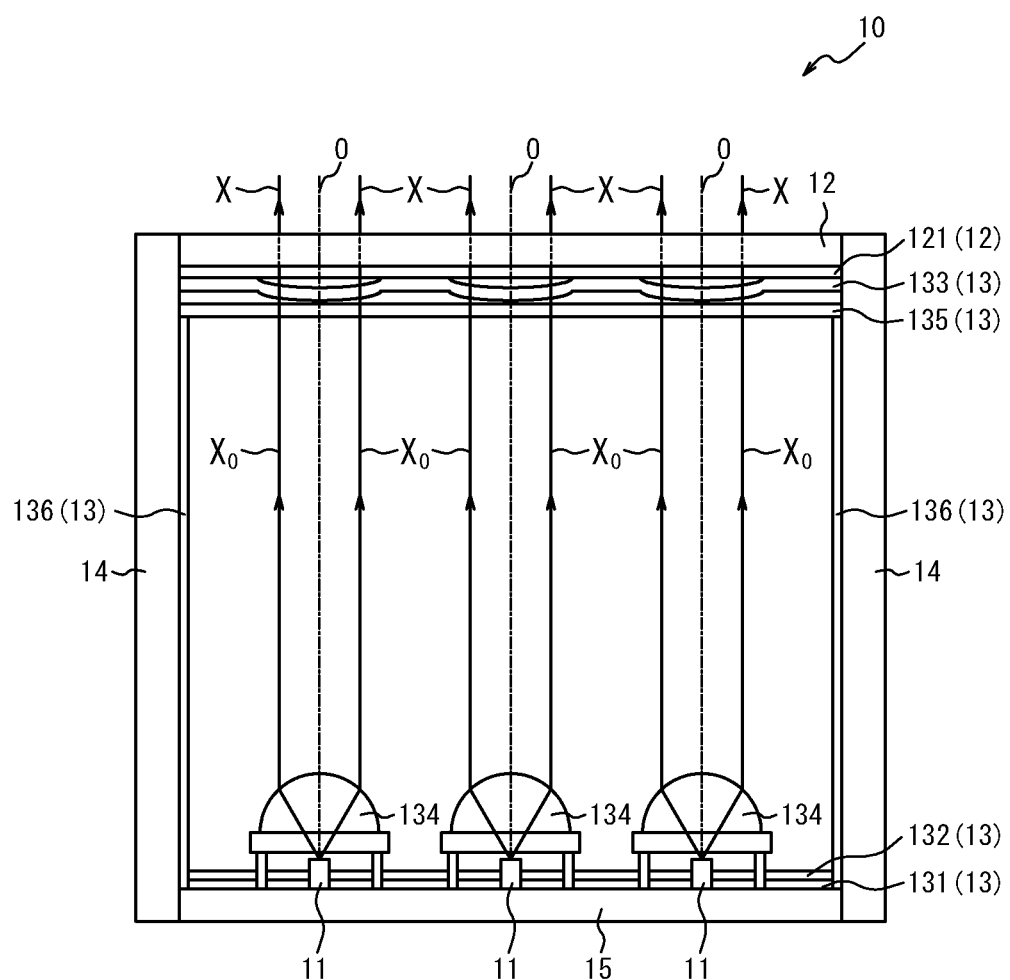
FIG. 3 illustrates the illumination light of the display device in FIG. 1.

The light source devices 11 are arranged on the substrate 15. As illustrated in FIG. 3, the light source devices 11 are members that emit illumination light $X_0$. In the example in FIG. 2, three light source devices 11 are positioned on the substrate 15. Any number of light source devices 11 may be provided. The illumination light $X_0$ emitted by each light source device 11 is transmitted by the illumination optical system 13 and irradiated onto the display panel 12, as illustrated in FIG. 3. Each light source device 11 may be one light emitting element. Each light source device 11 may include a plurality of light emitting elements that can be considered a single point light source. In each light source device 11, light emitting elements may be positioned near each other. Each light source device 11 includes one or more light emitting elements, such as LEDs, that each irradiate and emit non-polarized white light.

The display panel 12 is a transmission-type display panel. The display panel 12 includes the entrance-side polarizer 121. The display panel 12 includes a liquid crystal display panel or a MEMS shutter panel. The display panel 12 may, for example, include an exit-side polarizer, a glass substrate, transparent electrodes, an alignment film, a liquid crystal display element, a color filter, and the like. When the illumination light $X_0$ from the light source device 11 passes through the illumination optical system 13 and is irradiated on the display panel 12, the display panel 12 emits the transmitted light as the display light X, as illustrated in FIG. 3. The display light X becomes light corresponding to the image displayed on the display panel 12. When a color image is displayed on the display panel 12, the display light X becomes light corresponding to the color image. When the image displayed on the display panel 12 changes, the display light X changes in accordance with the changed image.

The illumination optical system 13 is positioned between the light source devices 11 and the display panel 12. The illumination optical system 13 guides the illumination light $X_0$ from each light source device 11 to the display panel 12.

The sidewalls 14 extend in a direction connecting the substrate 15 and the display panel 12. Together with the substrate 15 and the display panel 12, the sidewalls 14 enclose the periphery of the light source devices 11 and the illumination optical system 13.

The substrate 15 faces the display panel 12. The substrate 15 is, for example, provided in parallel with the display panel 12. The substrate 15 includes circuitry and the like to provide electrical power to the light source devices 11.

The entrance-side polarizer 121 is a polarizer included in the display panel 12. The entrance-side polarizer 121 is located at the side where the illumination light $X_0$ (see FIGS. 3 to 5) is incident, i.e. the light source device 11 side. Among the illumination light $X_0$ irradiated on the display panel 12, the entrance-side polarizer 121 transmits only a linearly polarized light component in a direction along the transmission axis of the entrance-side polarizer 121.

The first reflector 131 is disposed at a different position on the substrate 15 than the light source devices 11. The first reflector 131 is a film-shaped member that reflects incident light. In the present embodiment, the first reflector 131 is provided to cover the surface of the substrate 15 other than the light source devices 11, as illustrated in FIG. 2.

The quarter-wave plate 132 has a fast axis and a slow axis that are orthogonal to each other. The quarter-wave plate 132 transmits incident light while delaying the polarized component of the incident light along the slow axis by a quarter wavelength relative to the polarized component of the incident light along the fast axis. The quarter-wave plate 132 is disposed between the first reflector 131 and the display panel 12. The quarter-wave plate 132 is arranged so that the slow axis thereof is rotated by 45° relative to the transmission axis of the entrance-side polarizer 121. In the present embodiment, the quarter-wave plate 132 is provided to cover the surface of the first reflector 131 on the display panel 12 side, as illustrated in FIG. 2.

Among incident light, the reflective polarizer 133 transmits only a linearly polarized light component in a direction along the transmission axis and reflects other polarized components. The reflective polarizer 133 is disposed between the quarter-wave plate 132 and the display panel 12. The transmission axis of the reflective polarizer 133 is arranged to be parallel to the transmission axis of the entrance-side polarizer 121. In the present embodiment, the reflective polarizer 133 is provided to cover the surface of the entrance-side polarizer 121 of the display panel 12, as illustrated in FIG. 2.

The reflective polarizer 133 has convex shapes that are formed on the surface of the reflective polarizer 133 facing the light source devices 11 and have peaks at positions corresponding to the light source devices 11. The positions corresponding to the light source devices 11 are positions intersecting the optical axis O of the illumination light $X_0$ emitted from the light source devices 11, as illustrated in FIG. 3. Examples of the convex shapes of the reflective polarizer 133 include spherical caps (see FIG. 2) and cones. By having these convex shapes, the reflective polarizer 133 converts the light distribution of illumination light $X_0$ reflected by the reflective polarizer 133 to increase the proportion of reflected light incident on the first reflector 131. In other words, by having convex shapes, the reflective polarizer 133 reflects more of the incident illumination light $X_0$ towards the first reflector 131 than when not having convex shapes.

The lenses 134 are collimator lenses that convert the illumination light $X_0$ emitted by the light source device 11 to parallel light incident perpendicularly on the display panel 12, as illustrated in FIG. 3. At least one lens 134 is arranged in correspondence with each light source device 11. In the present embodiment, one lens 134 is provided in correspondence with each light source device 11 between the light source device 11 and the diffusing plate 135, as illustrated in FIG. 2.

The diffusing plate 135 is disposed between the lenses 134 and the reflective polarizer 133. The diffusing plate 135 diffuses and transmits the illumination light $X_0$ from the lenses 134 (see FIGS. 3 to 5) and guides the illumination light $X_0$ to the reflective polarizer 133. In the present embodiment, the diffusing plate 135 is provided to cover the surface of the reflective polarizer 133 facing the lenses 134, as illustrated in FIG. 2.

The second reflectors 136 are arranged on the surface of the sidewalls 14 facing the light path of the illumination light $X_0$. The second reflectors 136 are film-shaped members that reflect incident light. In the present embodiment, the second reflectors 136 are provided to cover the surface of the sidewalls 14 facing the light path of the illumination light $X_0$, as illustrated in FIG. 2.

Next, the illumination light $X_0$ of the display device 10 is described with reference to FIGS. 3 to 5. As illustrated in FIG. 3, the illumination light $X_0$ emitted by the light source devices 11 is converted by the lenses 134 to parallel light that is incident perpendicularly on the display panel 12. The illumination light $X_0$ converted to parallel light is transmitted by the diffusing plate 135 and is incident on the reflective polarizer 133.

Among the illumination light $X_0$ incident on the reflective polarizer 133, the linearly polarized light component (for example, P polarized light) in the direction along the transmission axis of the reflective polarizer 133 is transmitted by the reflective polarizer 133 and is incident on the entrance-side polarizer 121, as illustrated in FIG. 3. Since the transmission axis of the reflective polarizer 133 and the transmission axis of the entrance-side polarizer 121 are parallel, the illumination light $X_0$ transmitted by the reflective polarizer 133 is also transmitted by the entrance-side polarizer 121. The illumination light $X_0$ transmitted by the entrance-side polarizer 121 is converted to display light X by the display panel 12 and is emitted from the display panel 12.

Figure 4:
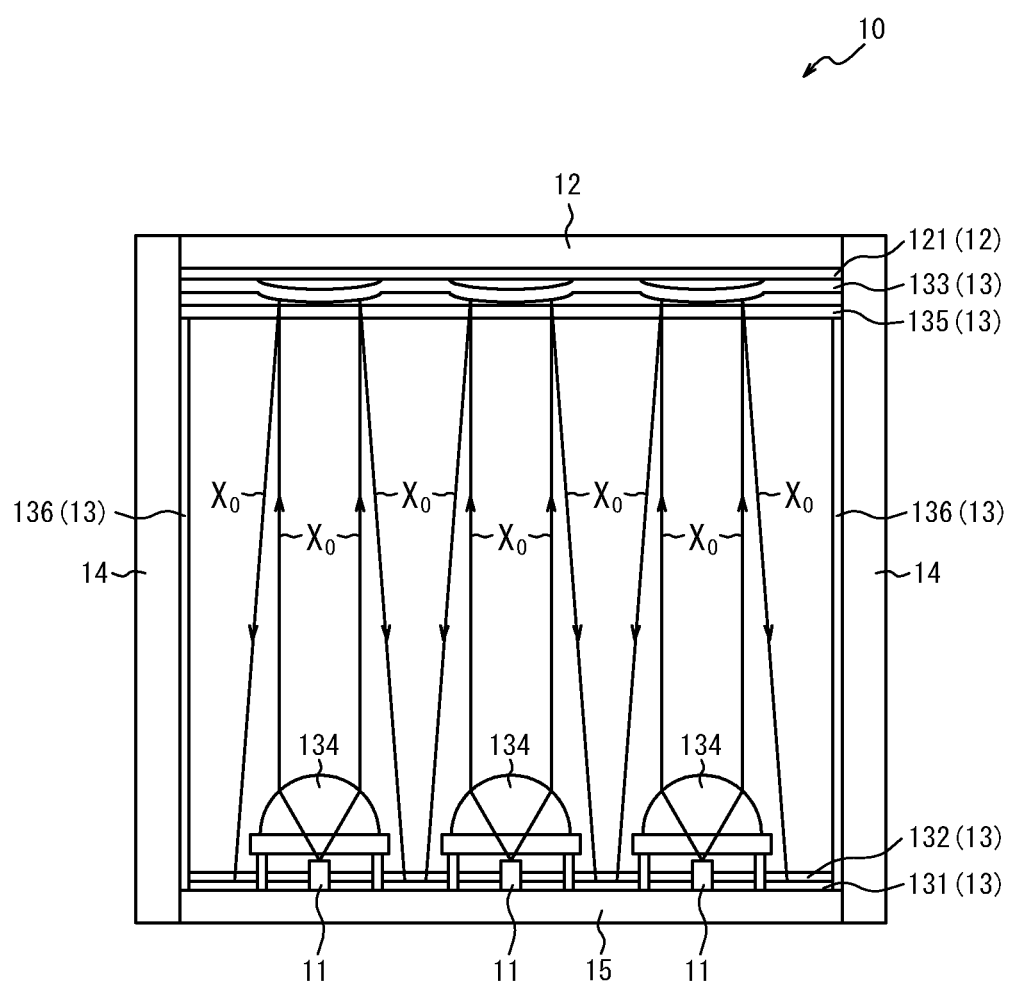
FIG. 4 illustrates the illumination light of the display device in FIG. 1.

On the other hand, among the illumination light $X_0$ incident on the reflective polarizer 133, the linearly polarized light component (for example, S polarized light) in the direction orthogonal to the transmission axis of the reflective polarizer 133 is reflected by the reflective polarizer 133, as illustrated in FIG. 4. The reflective polarizer 133 converts the orientation distribution of illumination light $X_0$ reflected by the reflective polarizer 133 to increase the proportion of reflected light incident on the first reflector 131. Consequently, the majority of the illumination light $X_0$ reflected by the reflective polarizer 133 is transmitted again by the diffusing plate 135 and is then transmitted by the quarter-wave plate 132 to be incident on the first reflector 131, as illustrated in FIG. 4. The illumination light $X_0$ is a linearly polarized light component (for example, S polarized light) in the direction orthogonal to the transmission axis of the reflective polarizer 133 and is converted to circularly polarized light when transmitted by the quarter-wave plate 132.

Figure 5:
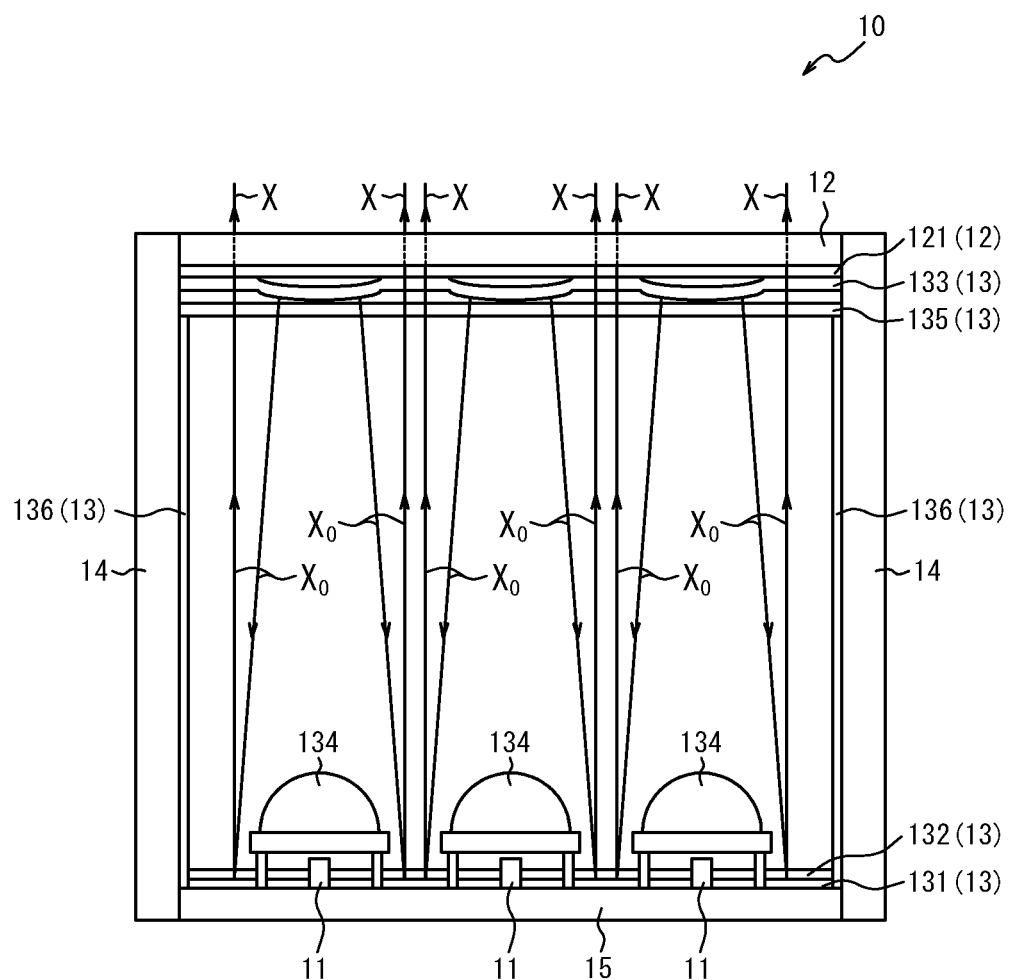
FIG. 5 illustrates the illumination light of the display device in FIG. 1.

The illumination light $X_0$ incident on the first reflector 131 is reflected by the first reflector 131, is transmitted again by the quarter-wave plate 132, and is then transmitted by the diffusing plate 135 to be incident on the reflective polarizer 133, as illustrated in FIG. 5. When transmitted by the quarter-wave plate 132, the circularly polarized illumination light $X_0$ is converted to a linearly polarized light component (such as P polarized light) in the direction along the transmission axis of the reflective polarizer 133. The illumination light $X_0$ incident on the reflective polarizer 133 is therefore transmitted by the reflective polarizer 133. The illumination light $X_0$ transmitted by the reflective polarizer 133 is transmitted by the entrance-side polarizer 121, converted to display light X by the display panel 12, and emitted from the display panel 12.

Among the illumination light $X_0$ emitted from the light source device 11, the linearly polarized light component in the direction orthogonal to the transmission axis of the entrance-side polarizer 121 included in the display panel 12 is thus reflected by the reflective polarizer 133, which converts the light distribution to increase the proportion of reflected light incident on the first reflector 131. When the reflected illumination light $X_0$ is reflected by the first reflector 131 and directed again towards the reflective polarizer 133, the illumination light $X_0$ is converted to a linearly polarized light component in the direction along the transmission axis of the entrance-side polarizer 121 by passing through the quarter-wave plate 132 twice. Consequently, the illumination light $X_0$ is transmitted by the reflective polarizer 133 and the entrance-side polarizer 121 and converted into display light X. The display device 10 can increase the use efficiency of the illumination light $X_0$. The light source devices 11 in the display device 10 can be arranged on the substrate 15 to face the display panel 12, thereby reducing the gap between the display panel 12 and the substrate 15 to make the display device 10 more compact.

The illumination light $X_0$ illustrated in FIGS. 3 to 5 is an example. A portion of the illumination light $X_0$ reflected by the reflective polarizer 133 in FIG. 4 and a portion of the illumination light $X_0$ reflected by the first reflector 131 in FIG. 5 may be incident on the second reflectors 136, for example. The illumination light $X_0$ incident on the second reflectors 136 is reflected by the second reflectors 136 and is incident on the quarter-wave plate 132 and the diffusing plate 135. In the same way as above, the illumination light $X_0$ is then converted into display light X and emitted from the display panel 12. The display device 10 can thus further increase the use efficiency of the illumination light $X_0$.

Second Embodiment

Figure 6:
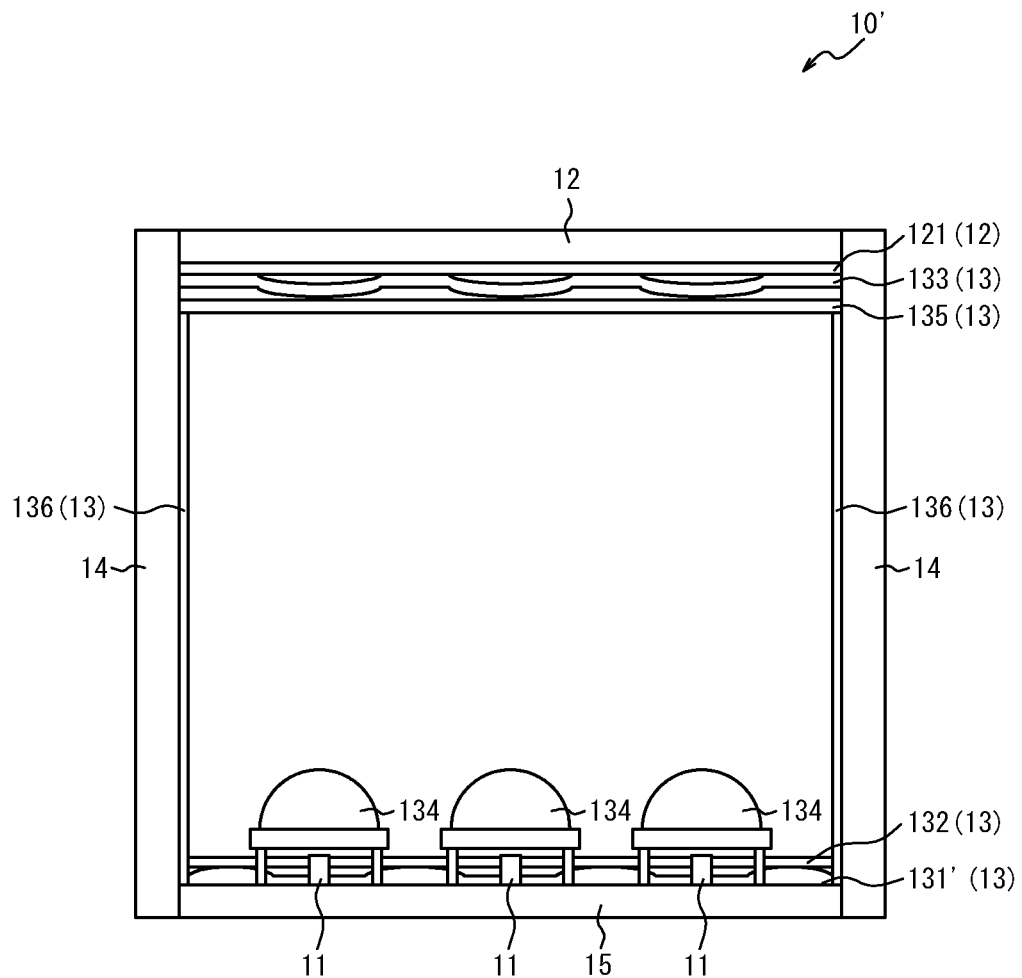
FIG. 6 illustrates the schematic configuration of a display device according to a second embodiment of the present disclosure.

A display device 10' according to the second embodiment of the present disclosure includes light source devices 11, a display panel 12, an illumination optical system 13, sidewalls 14, and a substrate 15, as illustrated in FIG. 6. The display panel 12 includes an entrance-side polarizer 121. The illumination optical system 13 includes a first reflector 131', a quarter-wave plate 132, a reflective polarizer 133, lenses 134, a diffusing plate 135, and second reflectors 136. The structure of the display device 10' other than the first reflector 131' is similar to that of the display device 10 according to the first embodiment. Hence, a description thereof is omitted.

The first reflector 131' is disposed at a different position on the substrate 15 than the light source devices 11. The first reflector 131' is a film-shaped member that reflects incident light. In the present embodiment, the first reflector 131' is provided to cover the surface of the substrate 15 other than the light source devices 11, as illustrated in FIG. 6.

The first reflector 131' has convex shapes and/or concave shapes formed on the surface of the first reflector 131' facing the display panel 12. Examples of the convex shapes and/or concave shapes of the first reflector 131' include spherical caps (see FIG. 6) and cones. When the illumination light $X_0$ is reflected by the reflective polarizer 133 and is incident on the first reflector 131', these convex shapes and/or concave shapes allow the first reflector 131' to reflect a greater proportion of the light as parallel light incident on the display panel 12 perpendicularly.

Next, the illumination light $X_0$ of the display device 10' is described with reference to FIG. 7. The illumination light $X_0$ other than the illumination light $X_0$ incident on the first reflector 131' is similar to the illumination light $X_0$ in the display device 10 according to the first embodiment. Hence, a description thereof is omitted.

Figure 7:
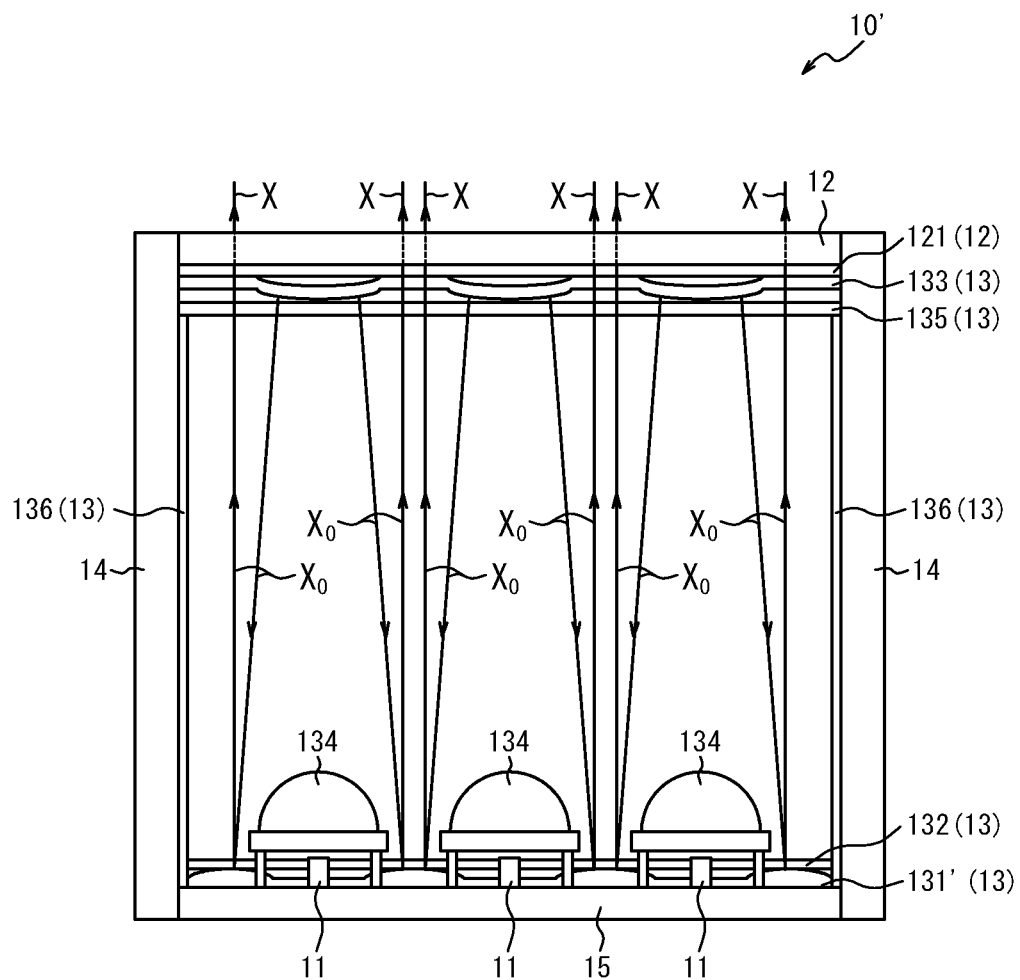
FIG. 7 illustrates the illumination light of the display device in FIG. 6.

When the illumination light $X_0$ is incident on the first reflector 131', a greater proportion is reflected as parallel light incident on the display panel 12 perpendicularly, as illustrated in FIG. 7. The display device 10' can thus further increase the use efficiency of the illumination light $X_0$, in addition to achieving the effects of the display device 10.

The present disclosure is based on the drawings and on embodiments, but it should be noted that a person of ordinary skill in the art could easily make a variety of modifications and adjustments on the basis of the present disclosure. Therefore, such changes and modifications are to be understood as included within the scope of the present disclosure. For example, the functions and the like included in the various components and steps may be reordered in any logically consistent way. Furthermore, components or steps may be combined into one or divided.

The display panel 12 included in the display device according to the above embodiments may include the reflective polarizer 133 as the entrance-side polarizer 121. In other words, the reflective polarizer 133 and the entrance-side polarizer 121 may be the same constituent element instead of being separate constituent elements.

The sidewalls 14 in the display device according to the above embodiments need not be provided to enclose the entire periphery of the light source devices 11 and the illumination optical system 13 and may instead enclose a portion of the periphery. Furthermore, the sidewalls 14, and similarly the second reflectors 136, may be omitted from the display device according to the above embodiments.

The display device according to the above embodiments is not limited to being used in the vehicle head-up display apparatus 1.

REFERENCE SIGNS LIST

1 Vehicle head-up display apparatus
10, 10' Display device
11 Light source device
12 Display panel
13 Illumination optical system
14 Sidewall
15 Substrate
20 Projection optical system
121 Entrance-side polarizer
131, 131' First reflector
132 Quarter-wave plate
133 Reflective polarizer
134 Lens
135 Diffusing plate
136 Second reflector
M Operator
O Optical axis
V Vehicle
X Display light
$X_0$ Illumination light
Y Translucent plate
Z Virtual image

The invention claimed is:

1. A display device comprising:
   a substrate, a light source device on the substrate, a transmission-type display panel, an illumination optical system configured to guide illumination light from the light source device to the display panel, and a sidewall extending in a direction connecting the substrate and the display panel; wherein
   the illumination optical system comprises:
      a first reflector at a different position on the substrate than the light source device;
      a quarter-wave plate between the first reflector and the display panel;
      a reflective polarizer between the quarter-wave plate and the display panel; and
      a second reflector on a surface of the sidewall facing a light path of the illumination light.

2. The display device of claim 1, wherein the illumination optical system further comprises a lens configured to convert the illumination light into parallel light incident on the display panel perpendicularly.

3. The display device of claim 1, wherein the first reflector has a convex shape and/or a concave shape formed on a surface of the first reflector facing the display panel.

4. The display device of claim 1, wherein the convex shape and/or the concave shape of the first reflector is a spherical cap or a cone.

5. A display device, comprising:
   a substrate, a light source device on the substrate, a transmission-type display panel, and an illumination optical system configured to guide illumination light from the light source device to the display panel; wherein
   the illumination optical system comprises:
      a first reflector at a different position on the substrate than the light source device;
      a quarter-wave plate between the first reflector and the display panel;
      a reflective polarizer between the quarter-wave plate and the display panel; and
      a lens configured to convert the illumination light into parallel light incident on the display panel perpendicularly; wherein
   the reflective polarizer has a convex shape, formed on a surface of the reflective polarizer facing the light source device, that has a peak at a position corresponding to the light source device.

6. The display device of claim 5, wherein the illumination optical system further comprises a diffusing plate between the lens and the reflective polarizer.

7. The display device of claim 5, wherein the convex shape of the reflective polarizer is a spherical cap or a cone.

8. The display device of claim 5, wherein the first reflector has a convex shape and/or a concave shape formed on a surface of the first reflector facing the display panel.

9. The display device of claim 8, wherein the convex shape and/or the concave shape of the first reflector is a spherical cap or a cone.

10. The display device of claim 5, wherein
the display panel comprises an entrance-side polarizer; and
the reflective polarizer is arranged so that a transmission axis of the reflective polarizer is parallel to a transmission axis of the entrance-side polarizer.

11. The display device of claim 5, wherein the quarter-wave plate is arranged so that a slow axis of the quarter-wave plate is rotated 45° relative to a transmission axis of the reflective polarizer.

12. The display device of claim 5, further comprising:
a sidewall extending in a direction connecting the substrate and the display panel; wherein
the illumination optical system further comprises a second reflector on a surface of the sidewall facing a light path of the illumination light.

13. A vehicle head-up display apparatus comprising:
the display device of claim 5; wherein
the vehicle head-up display apparatus causes display light from the display device to be reflected by a translucent plate of a vehicle so that a virtual image is visible to an operator.

14. The display device of claim 5, wherein the first reflector has a convex shape and/or a concave shape formed on a surface of the first reflector facing the display panel.

15. A display device comprising:
a substrate, a light source device on the substrate, a transmission-type display panel, an illumination optical system configured to guide illumination light from the light source device to the display panel, and a sidewall extending in a direction connecting the substrate and the display panel; wherein
the display panel comprises an entrance-side polarizer that is a reflective polarizer; and
the illumination optical system comprises:
a first reflector at a different position on the substrate than the light source device;
a quarter-wave plate between the first reflector and the display panel; and
a second reflector on a surface of the sidewall facing a light path of the illumination light.

16. The display device of claim 15, wherein the first reflector has a convex shape and/or a concave shape formed on a surface of the first reflector facing the display panel.

17. A display device, comprising:
a substrate, a light source device on the substrate, a transmission-type display panel, and an illumination optical system configured to guide illumination light from the light source device to the display panel; wherein
the illumination optical system comprises:
a first reflector at a different position on the substrate than the light source device;
a quarter-wave plate between the first reflector and the display panel;
a reflective polarizer between the quarter-wave plate and the display panel;
a lens configured to convert the illumination light into parallel light incident on the display panel perpendicularly; and
a diffusing plate between the lens and the reflective polarizer; wherein
the reflective polarizer has a convex shape, formed on a surface of the reflective polarizer facing the light source device, that has a peak at a position corresponding to the light source device.

18. The display device of claim 17, wherein the convex shape of the reflective polarizer is a spherical cap or a cone.

19. The display device of claim 18, wherein the first reflector has a convex shape and/or a concave shape formed on a surface of the first reflector facing the display panel.

20. The display device of claim 17, wherein the first reflector has a convex shape and/or a concave shape formed on a surface of the first reflector facing the display panel.

* * * * *